UNITED STATES PATENT OFFICE.

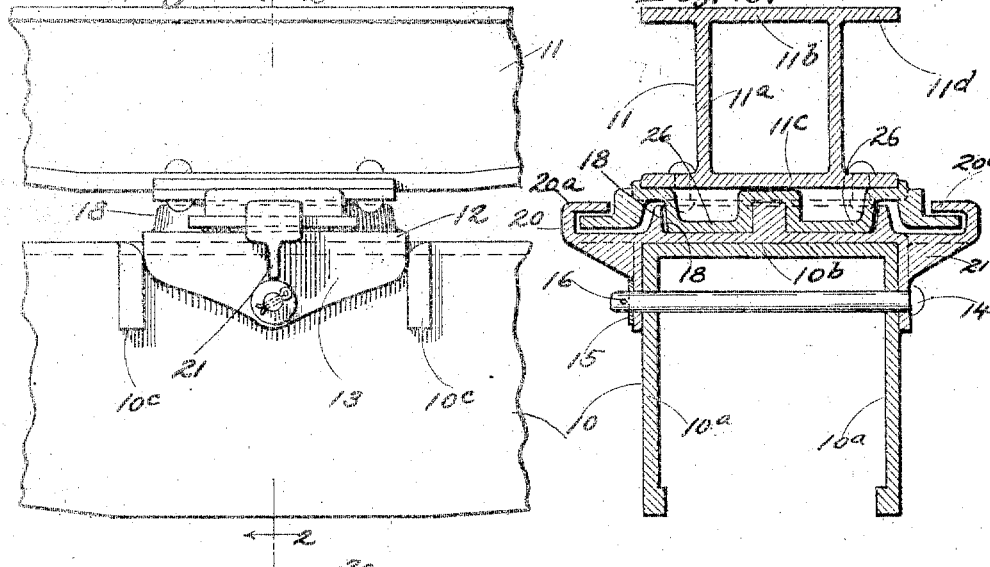
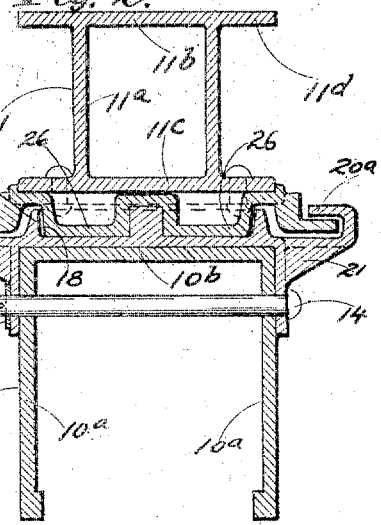
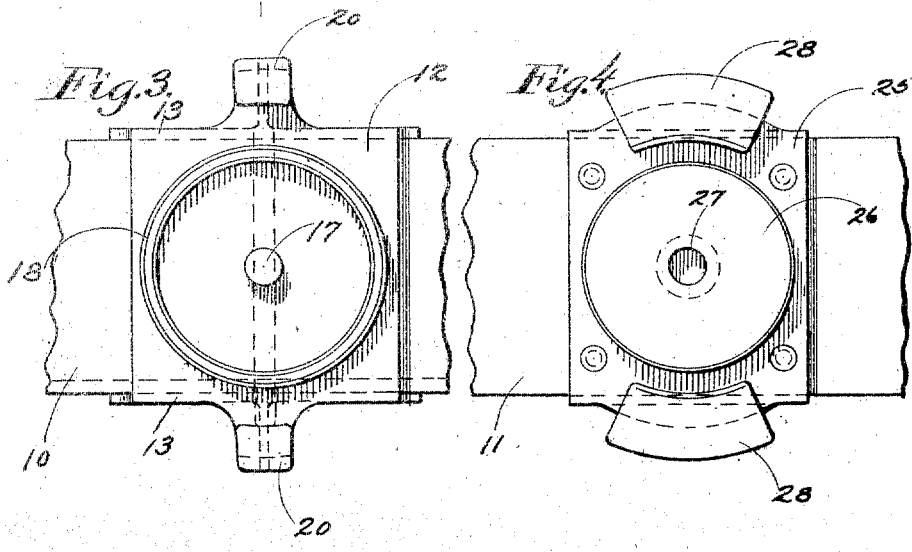
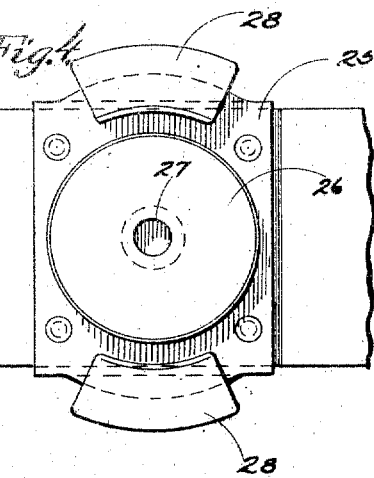

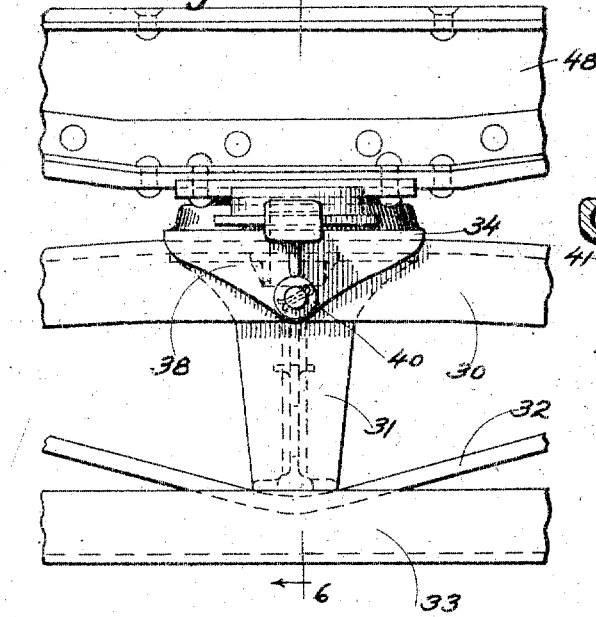
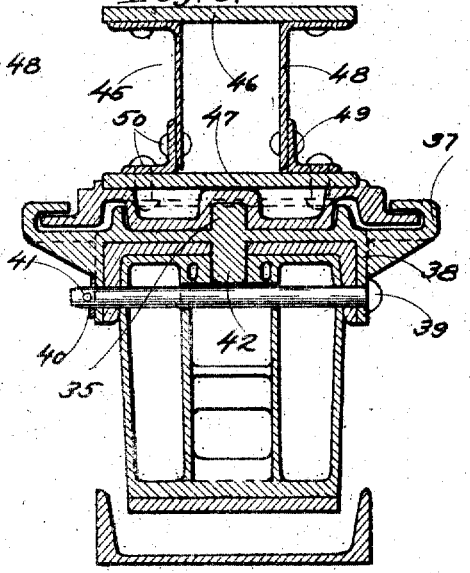
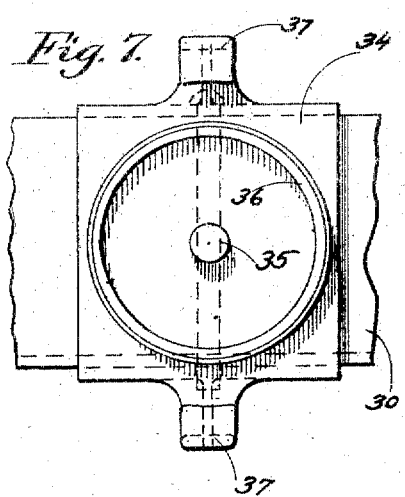
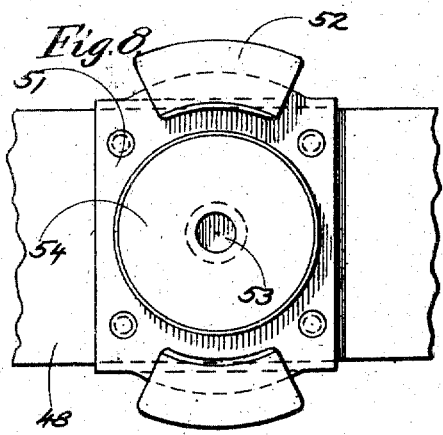

CHARLES DIETZ, OF CHICAGO, ILLINOIS, ASSIGNOR OF ONE-HALF TO PETER S. THEURER, OF CHICAGO, ILLINOIS; MYRA DIETZ ADMINISTRATRIX OF SAID CHARLES DIETZ, DECEASED.

CENTER-BEARING.

1,276,188.      Specification of Letters Patent.      Patented Aug. 20, 1918.

Application filed September 4, 1915. Serial No. 48,975.

*To all whom it may concern:*

Be it known that I, CHARLES DIETZ, a citizen of the United States, residing at Chicago, in the county of Cook and State of Illinois, have invented certain new and useful Improvements in Center-Bearings, of which the following is a specification.

This invention relates to center bearings, and in particular to center bearings adapted for use with railway cars and the like.

The principal object of the invention is to provide an improved center bearing construction whereby the truck and body bolsters are united in an improved manner, so that transverse stresses on the bolster pin or king-bolt are largely removed. The invention comprises a truck bolster plate and a body bolster plate having coacting parts through which horizontally acting forces are transmitted, and by which the stress on the central axial pin is relieved. My invention also comprises improved means for preventing vertical displacement of the truck and body bolsters within the usual working limits of angular movement thereof, while permitting relative vertical displacement when the bolsters are moved relatively to each other beyond the usual working limits of angular movement. A further object relates to improved means for detachably securing the truck bolster plate to the truck bolster.

These and other objects of the invention will appear more clearly in the following specification taken in connection with the accompanying drawings, in which two embodiments of the invention are illustrated.

In the drawings;

Figure 1 shows a side elevation of my improved center bearing, illustrating the embodiment thereof with a cast bolster construction;

Fig. 2 shows a central vertical section taken on the line 2—2 of Fig. 1;

Fig. 3 shows a top plan view of the truck bolster plate in position on the truck bolster;

Fig. 4 shows an inverted plan view of the body bolster plate secured to the body bolster;

Fig. 5 shows a side elevation of another form of my improved center bearing as embodied in a built up bolster construction;

Fig. 6 shows a central vertical section taken on the line 6—6 of Fig. 5;

Fig. 7 shows a plan view of the bolster plate illustrated in Figs. 5 and 6; and

Fig. 8 shows an inverted plan view of the truck bolster plate shown in Figs. 5 and 6.

In the form of my invention illustrated in Figs. 1 to 4 inclusive, the truck bolster 10 is formed integrally by casting or the like, and comprises side plates 10ª and the upper horizontally extending plate 10ᵇ. Located above the truck bolster is the body bolster 11 which is also formed integrally, as by casting or the like, and which comprises the vertically extending plates 11ª and horizontally extending plates 11ᵇ and 11ᶜ. It will be seen that the horizontally extending plates of the body bolster extend beyond the vertically extending plates 11ª so as to form laterally projecting flanges 11ᵈ.

Seated upon the truck bolster 10 is the truck bolster plate 12 which comprises oppositely disposed downwardly extending flanges 13 which closely engage the vertically extending plates 10ª of the truck bolster and which fit between the pairs of lugs 10ᶜ which are preferably formed integrally with the truck bolster and extend outwardly from each side thereof. It will be seen that the lugs 10ᶜ prevent movement of the truck bolster plate longitudinally of the truck bolster. Vertical movement of the truck bolster plate with respect to the truck bolster is prevented by the horizontal pin or bolt 14 which extends through apertures formed in the downwardly extending flanges 13 and through alining apertures in the plates 10ª of the truck bolster. A washer 15 is placed upon the end of the pin 14 and the same is secured in position by means of a cotter pin 16, or the like.

Formed integrally with or passing through the truck bolster plate and extending upwardly from the central portion thereof is the king bolt or bolster pin 17 which is cylindrical in form and which serves as an axis about which the truck bolster turns. An upwardly extending annular shoulder or sleeve 18 is formed on the truck bolster plate concentrically with the bolster pin 17, thus forming a depression around the bolster pin which acts as a seat for a complementary part carried by the body bolster. The truck bolster plate also comprises diametrically opposed upwardly turned hooked lugs or jaws 20 which are located in a plane transversely to the longitudinal axis of the truck bolster and which terminate in inwardly directed flanges 20ª adapted to prevent vertical displacement of the body bolster. The jaws 20 are reinforced by webs 21.

Secured to the flanges 11ᵈ of the body bolster, as by rivets or the like, or formed integrally therewith, is the body bolster plate 25 which is adapted to coact with the truck bolster plate above described. The body bolster plate comprises a circular downwardly extending part 26 which is adapted to seat within the depression formed within the annular shoulder 18 carried by the truck bolster plate. Centrally located in the circular part 26 of the body bolster plate is a cylindrical depression 27 which is adapted to be engaged by and which serves as a bearing for the bolster pin 17. The lateral substantially vertically extending surfaces of the cylindrical part 26 are adapted to coact with the corresponding substantially vertical surfaces on the inner side of the annular shoulder 18 so that in operation horizontally acting forces are transmitted from one bolster to the other through the coacting surfaces of the shoulder 18 and part 26 whereby the stresses on the bolster pin 17 are largely removed and the shearing off of said pin is thereby prevented. The annular coacting surfaces of the shoulder 18 and part 26 are preferably somewhat inclined with respect to the vertical plane so as to permit a ready engagement and disengagement of those parts and a slight clearance is left between the coacting surfaces, as shown in the drawings, to receive oil or other lubricant.

Formed integrally with the body bolster plate 25 are the outwardly extending horizontal flanges 28 which are diametrically opposed in a plane transverse to the longitudinal axis of the body bolster. These flanges are arcuate in form and are offset downwardly, being adapted to pass beneath the inwardly extending flanges 20ª of the hooked jaws 20 carried by the truck bolster plate. It will be seen that the upper surfaces of the flanges 28 are adapted to engage the flanges 20ª of the jaws 20 and thereby prevent relative vertical displacement of the bolsters. The flanges 28 are of such length as to prevent relative vertical displacement of the bolsters within the usual working limits of angular movement of the bolsters with respect to each other, but by turning the bolster plates relatively to each other through an increased angle, it will be seen that the flanges 28 will pass out of engagement with the jaws 20 so as to permit the removal of the body bolster from its position on the truck bolster. The degree of angular movement which is necessary to permit such relative displacement of the truck and body bolsters will depend upon the relative proportions of the jaws 20 and flanges 28 which proportions may be varied, as desired, to conform to the conditions which are being met with in practice. It will be seen that after withdrawing the horizontal pin 14 to release the truck bolster plate 12 from its seat on the truck bolster, the truck bolster plate may be turned angularly until the flanges 28 pass out of engagement with the flanges 20ª, after which the truck bolster plate may be lowered from its seat for inspection or repairs.

In the embodiment of my invention shown in Figs. 5 to 8 inclusive, the truck and body bolsters are shown as being built up from sections of metal which are united by rivets, or the like. In this construction the truck bolster comprises the bolster beam 30 which is preferably of channel form, and which is arched upwardly as shown in the drawings. Seated within the truck bolster beam 30 at its central point, and closely engaging the downwardly extending flanges thereof is the strut or block 31, the lower end of which is engaged by the bolster tie-rod 32. The usual spring plank 33 passes beneath the tie-rod 32.

Seated upon the truck bolster beam 30 is the truck bolster plate 34 which carries a central bolster pin 35 and an annular shoulder 36 concentric therewith which parts are similar to those previously described in connection with the other embodiment of my invention. The truck bolster plate 34 also comprises the outwardly extending diametrically opposed hooks or jaws 37 which are similar to the jaws 20 previously described. The plate 34 has downwardly extending flanges 38 which closely engage the downwardly extending flanges of the beam 30 and a horizontally extending bolt 39 passes through alining apertures formed in the flanges 38, through the vertically extending plates of the strut 31, and through the downwardly extending flanges of the beam 30. A washer 40 engages the end of the bolt 39 and the latter is secured in position by means of a cotter pin 41 or by other similar fastening means. It will be seen that by this construction the bolster plate 34 is prevented from moving horizontally or vertically with respect to the truck bolster, but the parts are further secured against relative movement by means of the downwardly extending lug or pin 42 which is formed integrally with the plate 34 in alinement with the bolster pin 35 and which engages alining apertures formed in the horizontally extending part of the beam 30 and through the adjacent part of the strut 31.

In this embodiment of my invention the body bolster 45 comprises upper and lower transverse plates 46 and 47 which are united by angle beams 48 and 49, all of said parts being secured in proper relation to each other by means of rivets 50, or the like. Secured to the lower plate 47 of the body bolster 45 is the body bolster plate 51 having diametrically disposed arcuate flanges 52, a central depression 53 adapted to receive the bolster pin 35, and a downwardly extending part 54 adapted to seat within the depression formed within the annular shoulder 36. These parts are similar to and operate in the same manner as the corresponding parts described in connection with the form of my invention shown in Figs. 1 to 4, inclusive.

It will be seen that with either form of my invention the body bolsters may be readily separated from each other when desired merely by displacing the bolsters with respect to each other through the required angular distance, while vertical displacement of the bolsters with respect to each other is prevented when the car is in operation by virtue of the interengaging flanges carried by the bolster plates. It will also be understood that the center pin or king bolt may be omitted if desired, in which case the bolsters will turn relatively to each other about the interlocking sleeves or shoulders through which forces are transmitted from one bolster to the other. It will be seen that my improved construction provides a relatively large bearing area and a firm and steady connection is formed between the bolsters so that shocks and other unsatisfactory features are eliminated.

While I have shown and described two particular forms which my invention may take, it will be understood that the principles of the invention may be embodied in various other structures without departing from the scope of the invention as defined in the appended claims.

What I claim is:

1. In a device of the class described, a truck bolster, a body bolster, a truck bolster plate, downwardly extending flanges on said truck bolster plate adapted to engage the opposite sides of said truck bolster, a pin passing through said flanges and said truck bolster, lugs projecting from said truck bolster at opposite ends of said flanges, and means for operatively connecting said truck bolster plate and said body bolster.

2. In a device of the class described, a truck bolster, a body bolster, a truck bolster plate seated on said truck bolster, flanges extending downwardly from said truck bolster plate and engaging the opposite sides of said truck bolster, a pin extending through said flanges and said truck bolster to prevent vertical displacement of said truck bolster plate, additional means to prevent vertical displacement of said truck bolster plate with respect to said truck bolster, and means for operatively connecting said truck bolster plate and said body bolster.

3. In a device of the class described, a truck bolster, a body bolster, a truck bolster plate seated on said truck bolster and having flanges extending downwardly at opposite sides thereof, hooked lugs carried by said truck bolster at opposite sides of said flanges, and means engaging said hooked lugs for operatively connecting said truck bolster plate and said body bolster.

4. In a device of the class described, a bolster, a bolster plate seated on said bolster and having transversely extending flanges at opposite sides of said bolster, a pin extending transversely through said flanges and said bolster, and hooked lugs carried by and extending outwardly from said bolster at each side of said flanges.

5. In a device of the class described, a bolster, a bolster plate seated thereon and having flanges extending downwardly at each side thereof, a pin extending transversely through said flanges and through said bolster, and a lug extending downwardly from said bolster plate, said bolster having a depression adapted to receive said lug.

6. In a device of the class described, a truck bolster, a body bolster, a truck bolster plate seated on said truck bolster, said truck bolster plate having a centrally located pin projecting upwardly therefrom and an upwardly extending annular flange concentric with said pin, a body bolster plate attached to said body bolster and having a downwardly extending annular projection adapted to seat in the depression between said pin and said flange of said truck bolster plate, said body bolster plate having oppositely disposed arcuate flanges extending downwardly outwardly of said flange on said truck bolster plate, horizontally extending arcuate flanges projecting outwardly from said last mentioned flanges of said body bolster plate, and oppositely disposed hooked jaws carried by said truck bolster plate and arranged to receive said horizontal arcuate flanges of said body bolster plate.

In testimony whereof, I have subscribed my name.

CHARLES DIETZ.